(12) United States Patent
Oyama et al.

(10) Patent No.: US 7,549,088 B2
(45) Date of Patent: Jun. 16, 2009

(54) COMMUNICATION APPARATUS AND PROGRAM PROVIDED WITH FAILURE DETERMINING METHOD AND FUNCTION

(75) Inventors: Kazuhiko Oyama, Kawasaki (JP); Koji Hanada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 419 days.

(21) Appl. No.: 11/151,196

(22) Filed: Jun. 14, 2005

(65) Prior Publication Data

US 2006/0215525 A1     Sep. 28, 2006

(30) Foreign Application Priority Data

Mar. 25, 2005   (JP)   .............. 2005-087693

(51) Int. Cl.
*G06F 11/00*   (2006.01)
(52) U.S. Cl. .............. 714/39; 714/25; 714/37
(58) Field of Classification Search ........... 714/20, 714/25, 26, 34, 37, 39, 43, 55, 56
See application file for complete search history.

(56) References Cited

U.S. PATENT DOCUMENTS

| 5,325,528 | A  | * | 6/1994  | Klein         | 719/313 |
| 6,182,086 | B1 | * | 1/2001  | Lomet et al.  | 707/202 |
| 6,658,590 | B1 | * | 12/2003 | Sicola et al. | 714/6   |
| 7,325,171 | B2 | * | 1/2008  | Castro        | 714/56  |
| 2003/0225830 | A1 | * | 12/2003 | Kataoka et al. | 709/203 |

FOREIGN PATENT DOCUMENTS

| JP | 05-040744    | 2/1993 |
| JP | 2002-091708  | 3/2002 |
| JP | 2003-258833 A | 9/2003 |

OTHER PUBLICATIONS

"Japanese Office Action", mailed Mar. 3, 2009, for JP Pat. App. No. 2005-087693. Partial English translation.

* cited by examiner

*Primary Examiner*—Joshua A Lohn
(74) *Attorney, Agent, or Firm*—Fujitsu Patent Center (57) ABSTRACT

Disclosed is a method of determining a failure in an information system including a transmission apparatus for transmitting control information and a reception apparatus connected to the transmission apparatus in such a manner as to enable information to be transmitted and received for receiving the control information, the reception apparatus transmitting response information to the received control information, wherein the transmission apparatus obtains, as first clock time, clock time of the most recently transmitted control information if the response information to the control information cannot be obtained within predetermined time period, wherein the transmission apparatus obtains, as second clock time, later one of clock time of the response information most recently transmitted by the reception apparatus and clock time of the control information most recently received by the reception apparatus, and wherein the transmission apparatus determines failure location based on the first clock time and the second clock time.

12 Claims, 6 Drawing Sheets

| SERVER | STORAGE | TIME | FAILURE |
|---|---|---|---|
| TRANSMITTED FRAME | RECEIVED FRAME | SERVER ≦ STORAGE | STORAGE |
| TRANSMITTED FRAME | RECEIVED FRAME | SERVER > STORAGE | SERVER GBIC |
| RECEIVED FRAME | TRANSMITTED FRAME | SERVER ≦ STORAGE | STORAGE GBIC |
| RECEIVED FRAME | TRANSMITTED FRAME | SERVER > STORAGE | SERVER GBIC |

FIG. 6

COMMUNICATION APPARATUS AND PROGRAM PROVIDED WITH FAILURE DETERMINING METHOD AND FUNCTION

BACKGROUND OF THE INVENTION

1. Field of the Invention

The present invention relates to a transmission apparatus and related program provided with a failure determining method and function for, when a failure occurs in an information system including a transmission apparatus transmitting control information and a reception apparatus transmitting response information to the control information and the causal location is to be found out, narrowing down a range of the causal location to facilitate the cause investigation.

2. Description of the Related Art

Generally, an information system consisting of a server, a client, storage and others has a transmission apparatus transmitting control information and a reception apparatus transmitting response information to the control information. For example, Japanese Patent Application Laid-Open Publication No. 1993-40744 describes an information system with a host computer transmitting a response frame (response information) to a control frame (control information) transmitted by an I/O apparatus.

Also, from the view point of a model of the server-storage model, the server issues a read instruction (control information) and the storage responds to the read instruction with data (response information) stored in the storage. Also, the server issues a write instruction (control information) and the storage responds to the write information with a write completion notification (respond information).

Currently, when the information system is constructed, SAN (Storage Area Network) is increasingly constructed which connects the serve and the storage with high-speed network using the fiber channel, i.e. an interface standard for performing high-speed and long-distance data transfer. For Example, Japanese Patent Application Laid-Open Publication No. 2002-91708 discloses a disk array apparatus using a fiber channel interface (hereinafter, referred to as FC interface).

In these information systems, if the response information to the control information transmitted by a transmission apparatus cannot be obtained from the reception apparatus, the transmission detects a timeout error. The timeout error is often caused by a failure location occurring in any one of the transmission apparatus, the reception apparatus and communication path connecting the transmission apparatus and the reception apparatus.

However, in prior art, if a transmission apparatus detects a timeout error, it is difficult to identify a failure location causing the error. For example, if the timeout error occurs between a server and storage, the server cannot determine whether the cause of the error is: that the storage does not function, although the server has transmitted I/O instructions such as a read instruction and write instruction; that a communication path to the server has a problem, although the storage has transmitted the response information; or that an FC interface of the server is broken and the I/O instructions issued by the server has not been transmitted.

Therefore, if the timeout error between the server and the storage occurs on an end user's site where an information system was delivered, it takes time to identify the failure location. In other words, a long time is needed for recovering the information system to a normal state, and it is problematic that a significant impact is placed on end users using the information system for business purpose.

SUMMARY OF THE INVENTION

It is therefore an object of the present invention to provide a transmission apparatus and related program with a method and function for determining a failure, when a timeout error occurs, in order to locate the place of the causal failure location, narrowing down a range of the causal location to facilitate the cause investigation.

The above object is achieved by providing, as a first aspect of the present invention, a method of determining a failure in an information system including a transmission apparatus for transmitting control information and a reception apparatus connected to the transmission apparatus in such a manner as to enable information to be transmitted and received for receiving the control information, the reception apparatus transmitting response information to the received control information, wherein the transmission apparatus obtains, as a first clock time, a clock time of the most recently transmitted control information if the response information to the control information cannot be obtained within a predetermined time period, wherein the transmission apparatus obtains, as a second clock time, later one of a clock time of the response information most recently transmitted by the reception apparatus and a clock time of the control information most recently received by the reception apparatus, and wherein the transmission apparatus determines a failure location based on the first clock time and the second clock time.

Preferably, the transmission apparatus decides that the failure location does not exist at least in the transmission apparatus if the first clock time is equal to or earlier than the second clock time, whereas the transmission apparatus decides that the failure location does not exist at least in the reception apparatus if the first clock time is later than the second clock time.

The above object of the present invention is achieved by providing, as a second aspect of the present invention, a transmission apparatus in an information system including the transmission apparatus for transmitting control information and a reception apparatus connected to the transmission apparatus in such a manner as to enable information to be transmitted and received for receiving the control information, the reception apparatus transmitting response information to the received control information, the transmission apparatus comprising a first acquisition unit obtaining, as a first clock time, a clock time of the most recently transmitted control information if the response information to the control information cannot be obtained within a predetermined time period; a second acquisition unit obtaining, as a second clock time, later one of a clock time of the response information most recently transmitted by the reception apparatus and a clock time of the control information most recently received by the reception apparatus; and a determination unit determining a failure location based on the first clock time and the second clock time.

The above object of the present invention is achieved by providing, as a third aspect of the present invention, a program operable to drive a transmission apparatus in an information system including the transmission apparatus for transmitting control information and a reception apparatus connected to the transmission apparatus in a manner allowing information transmission and reception for receiving the control information, the reception apparatus transmitting response information to the received control information, to execute an operation of obtaining, as a first clock time, a clock time of the most recently transmitted control information if the response information to the control information cannot be obtained within a predetermined time period; an operation of obtaining, as a second clock time, later one of a clock time of the response information most recently transmitted by the reception apparatus and a clock time of the control information most recently received by the reception apparatus; and an operation of determining a failure location based on the first clock time and the second clock time.

According to embodiments of the present invention, when a timeout error occurs, a failure location can be easily narrowed down based on time information of the last transmitted and received data left in a transmission apparatus and a reception apparatus and the time required to identify the failure location can be reduced over a conventional method.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

Embodiments of the present invention will now be described with reference to the accompanying drawings. However, the technical field of the present invention is not limited to the embodiments but covers the invention as defined in the claims and equivalents thereof.

Figure 1:
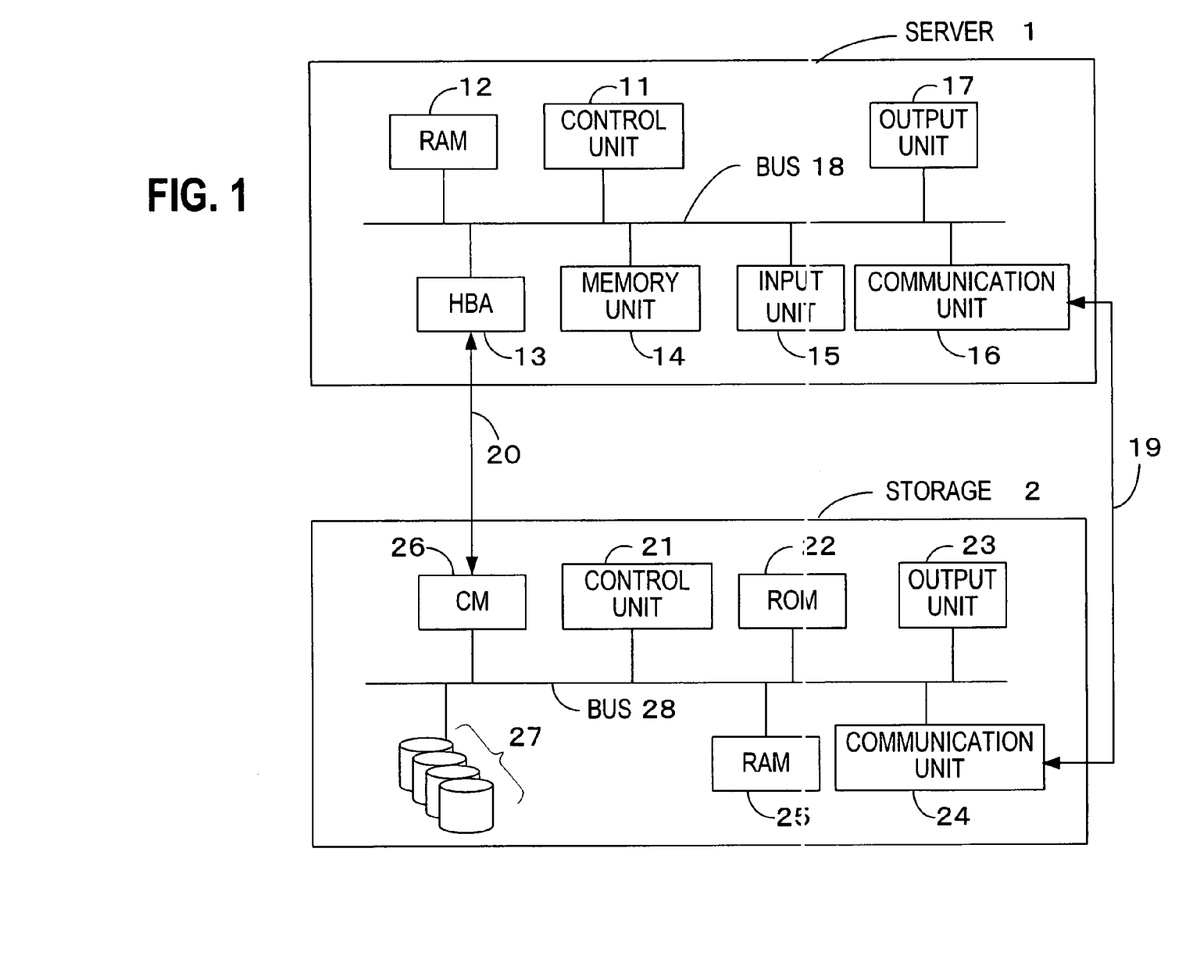
FIG. 1 is a configuration block diagram of an information system of the embodiment.

FIG. 1 is a configuration block diagram of an information system of the embodiment. The information system of the embodiment includes a server 1 and storage 2. The server 1 and the storage 2 are connected with a fiber channel cable (hereinafter, referred to as FC cable) 20 in order to control input and output of data stored in the storage 2 and are connected with a network cable 19 in order to control a control unit of the storage 2 from the server.

The server 1 of FIG. 1 includes a communication unit 16, a control unit 11, a RAM (Random Access Memory) 12, a memory unit 14, an input unit 15, an output unit 17, a HBA (Host Bus Adapter) 13 which are connected with each other via a bus 18. The communication unit 16 transmits and receives data in conformity with a network protocol such as TCP/IP (Transmission Control Protocol/Internet protocol) to and from the storage 2 via the network cable 19.

The memory unit 14 is memory means for storing a control program used for controlling the server 1. During operation of the server 1, the control program is deployed on the RAM 12 and executed by a CPU (not shown) included in the control unit 11.

The RAM 12 is memory means for temporarily storing calculation results and programs for processing of the server 1. The input unit 15 is input means for inputting requests of a user, such as a mouse and a keyboard. The output unit 17 is display means for providing information to the user, such as a liquid crystal display. The HBA 13 provides an interface for connecting the server 1 to the FC cable 20 which transfers data in conformity with a fiber channel protocol (FC protocol).

The storage 2 of FIG. 1 includes a communication unit 24, a control unit 21, a ROM (Read Only Memory) 22, a RAM (Random Access Memory) 25, an output unit 23, a CM (Connect Module) 26 which are connected with each other via a bus 28. The communication unit 26 transmits and receives data in conformity with a network protocol such as TCP/IP (Transmission Control Protocol/Internet protocol) to and from the server 1 via the network cable 19.

The ROM 22 is memory means for storing a control program used for controlling the storage 2. During operation of the storage 2, the control program is deployed on the RAM 25 and executed by a CPU (not shown) included in the control unit 21.

The RAM 25 is memory means for temporarily storing calculation results and programs for processing of the storage 2. The output unit 23 is display means for providing error information ant the like of the storage 2 to the user, such as a liquid crystal display. The CM 26 provides an interface for connecting the storage 2 to the FC cable 20 which transfers data in conformity with a fiber channel protocol (FC protocol). A disk array 27 includes a plurality of disks and accumulates data stored in the storage 2.

In the FC protocol, data in units of frames are exchanged between the server 1 and the storage 2 via the FC cable. The HBA 13, i.e the FC interface on the server 1 side and the CM 26, i.e. the FC interface on the storage 2 side are provided with a transmission and reception buffer to temporarily store frames to be transmitted and frames received, respectively.

As a feature of the information system of the embodiment, the HBA 13, i.e the FC interface on the server 1 side and the CM 26, i.e. the FC interface on the storage 2 side are provided with small capacity buffer memory which can store one (1) newest (the last stored) frame in each of the transmission and reception buffers. Also, the server 1 and the storage 2 separately memorizes a clock time when the frame is stored in the small capacity buffer memory. In this way, when a timeout error occurs for the issued input-output instruction (the read instruction and write instruction), the server 1 can determine where the failure location is, based on the contents and the clock times for the small capacity buffer memories provided in the server 1 and the storage 2 respectively.

Figure 2:
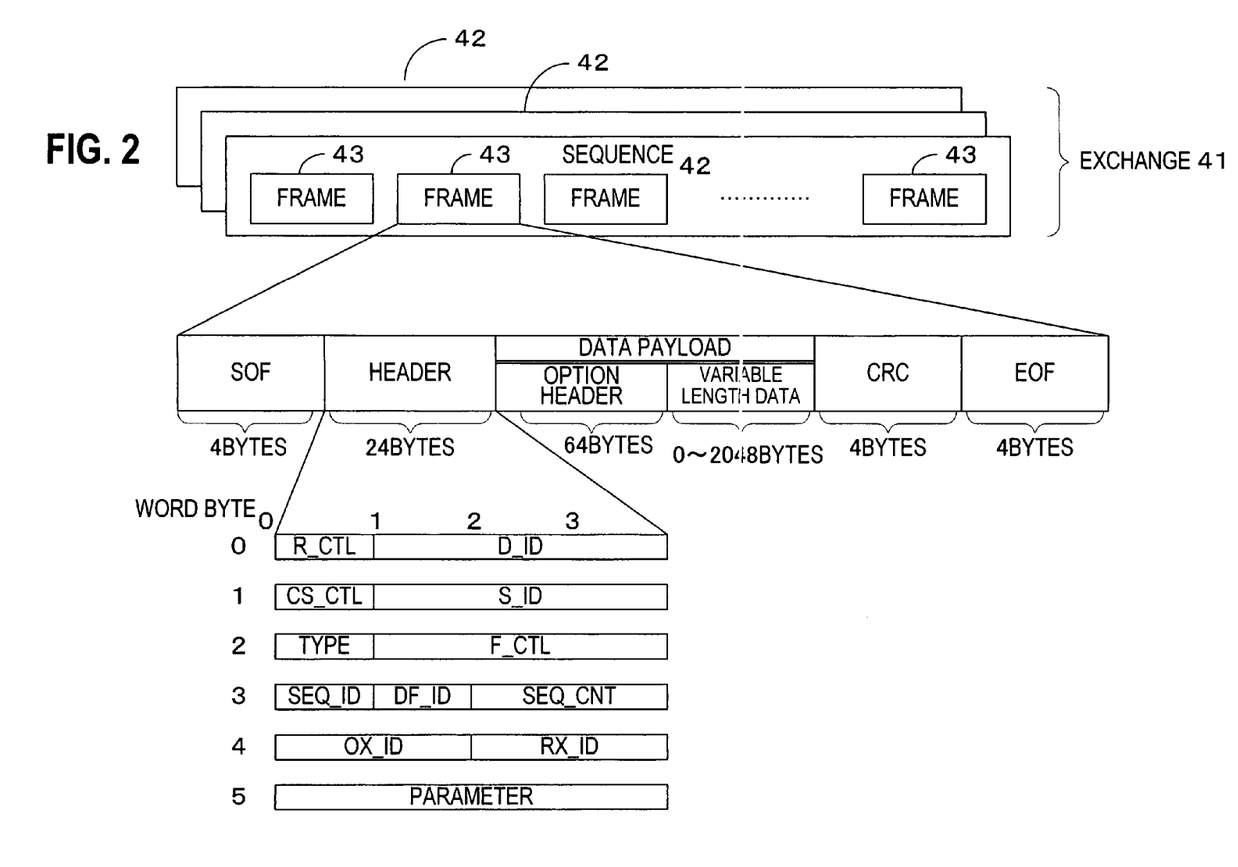
FIG. 2 is a diagram describing a data configuration of a frame based on a fiber channel protocol used in this embodiment.

FIG. 2 is a diagram describing a data configuration of a frame based on a fiber channel protocol used in this embodiment. The frame 43 is a minimum unit of the data transmission in the FC protocol. The a plurality of frames 43 constitute a sequence 42.

The sequence 42 corresponds to a command for such as establishing connections or transmitting data. A plurality of sequences 42 constitute an exchange 41 corresponding to the input-output instruction such as the read instruction and the write instruction.

Each frame includes data fields of "SOF", "header", "data pay load", "CRC" and "EOF". The "SOF" stands for Start of Frame and is a four-byte field indicating the start of frame.

The "header" is a 24-byte field indicating control information for assemble and disassembly of data. The header includes D_ID which indicates a destination address and S_ID which indicates a source address. In this embodiment, the server 1 and the storage 2 have different addresses.

Therefore, the server 1 can determine whether a frame is transmitted by the server 1 to the storage 2 or transmitted by the storage 2 to the server, by identifying the D_ID field and the S_ID field included in the frame header.

The "data payload" includes variable length (0 to 2048 bytes) data. The "CRC" stands for Cyclic Redundancy Check and is a symbol added to data in order to detect an error such as a bit inversion during data transfer. The "EOF" stands for End of Frame and is a four-byte field indicating the end of frame.

Figure 3:
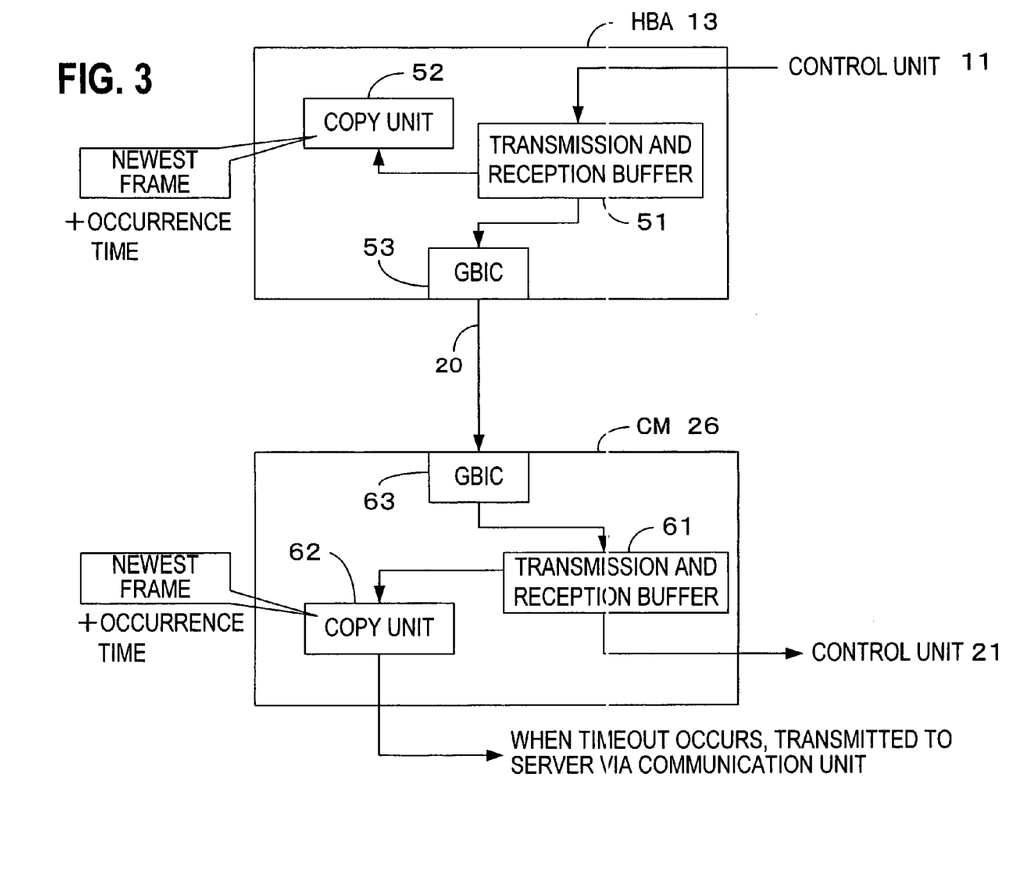
FIG. 3 is a diagram describing a FC interface (HBA) in the server and a FC interface (CM) in the storage.

FIG. 3 is a diagram describing the FC interface (HBA 13) in the server 1 and the FC interface (CM 26) in the storage 2. FIG. 3 shows the case that the server 1 transmits an input-output instruction to the storage 2.

The input-output instruction input by the control unit 11 of the server 1 is first stored as a plurality of frames into a transmission and reception buffer 51 included in the HBA 13 of the server 1. At this point, the last frame included in the input-output instruction is copied to a copy unit 52 of the server 1, which is a small capacity buffer memory. The control unit 11 of the server 1 stores a clock time when the data is stored in the copy unit 52 into the RAM 12 of the server 1.

Then, the input-output instruction input from the control unit 11 of the server 1 is input to the storage 2 via the FC cable 20 by a GBIC (Gigabit Interface Converter) 53 which converts electric signals into optical signals. The input-output instruction input from the server 1 is converted by a GBIC 63 provided in the storage 2 and stored in a transmission and reception buffer 61 included in the CM 26 of the storage 2.

At this point, the last frame received from the server 1 is copied to a copy unit 62 of the storage 2, which is a small capacity buffer memory. The control unit 21 of the storage 2 stores a clock time when the data is stored in the copy unit 62 into the RAM 25 of the storage 2.

Although FIG. 3 shows the case that the server 1 transmits the input-output instruction to the storage 2, if the storage 2 transmits the input-output instruction to the server 1, the operations performed will be operations in the case of swapping the HBA 13 with the CM 26 and the server 1 with the storage 2 in FIG. 3.

In other words, the input-output instruction input by the control unit 21 of the storage 2 is first stored as a plurality of frames into the transmission and reception buffer 61 included in the CM 26 of the storage 2. At this point, the last frame included in the input-output instruction is copied to the copy unit 62 of the storage 2, which is a small capacity buffer memory. The control unit 21 of the storage 2 stores a clock time when the data is stored in the copy unit 62 into the RAM 25 of the storage 2.

Then, the input-output instruction input from the control unit 21 of the storage 2 is input to the server 1 via the FC cable 20 by the GBIC 63. The input-output instruction input from the storage 2 is converted by the GBIC 53 provided in the server 1 and stored in the transmission and reception buffer 51 included in the HBA 13 of the server 1.

At this point, the last frame received from the storage 2 is copied to the copy unit 52 of the server 1, which is a small capacity buffer memory. The control unit 11 of the server 1 stores a clock time when the data is stored in the copy unit 52 into the RAM 12 of the server 1.

If the storage does not respond to the input-output instruction issued by the server 1 with response information within a predetermined time period, the server 1 detects a timeout error. At this time, the server 1 obtains the newest frame stored in the copy unit 52 included in the HBA 13 and the occurrence time stored in the RAM 12.

Also, the server 1 transmits an information acquisition request to the storage via the network cable 19. When the control unit 21 of the storage 2 receives the information acquisition request from the server 1 via the communication unit 24, the control unit 21 of the storage 2 transmits the newest frame stored in the copy unit 62 included in the CM 26 and the occurrence time stored in the RAM 25, via the communication unit 24 again.

In this way, the server 1 obtains the newest frame stored in the copy unit 62 included in the CM 26 of the storage 2 and the occurrence time stored in the RAM 25. The server 1 performs processing for determining the failure location based on the obtained information by executing the determination processing shown in the following diagram.

Figure 4:
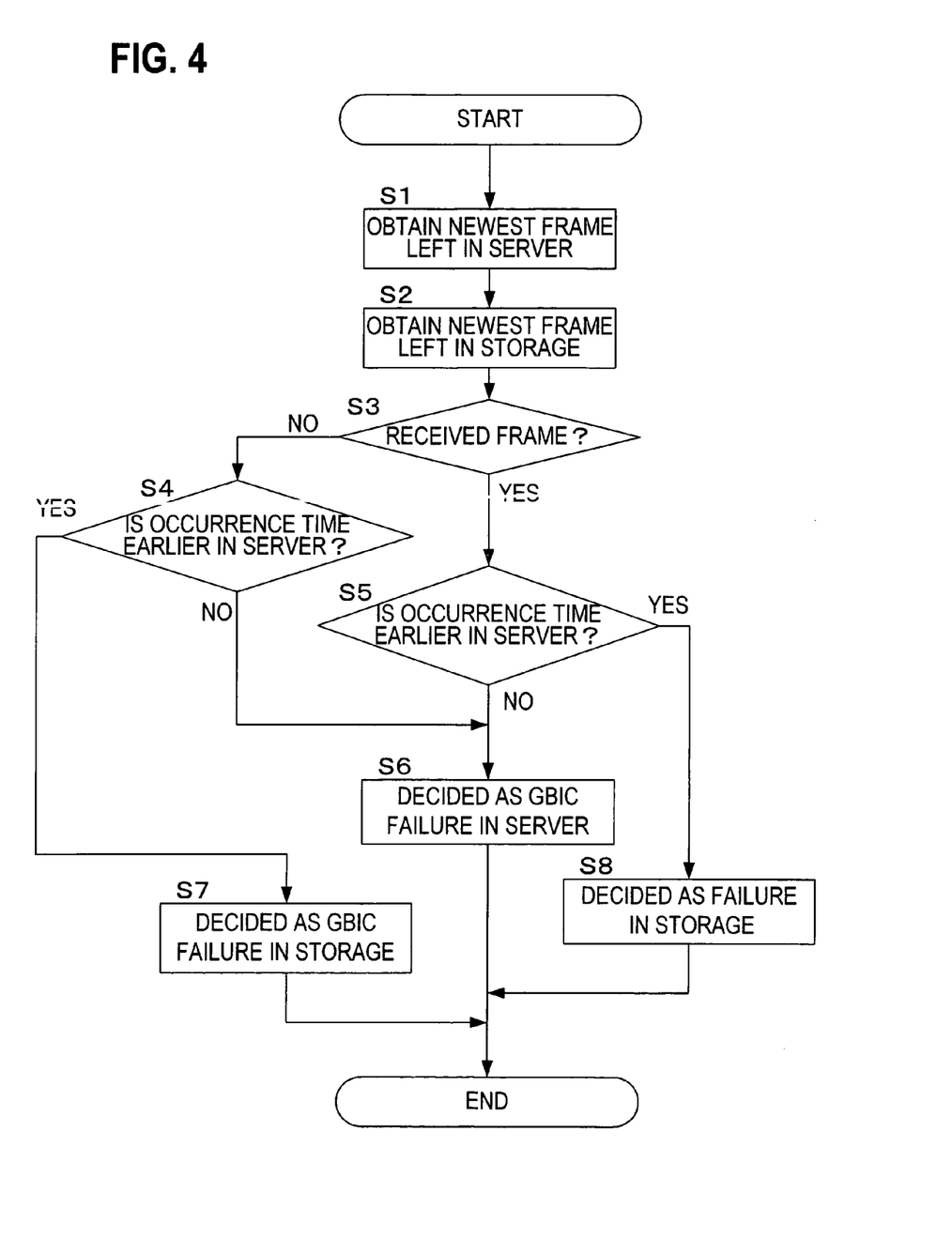
FIG. 4 is a flow chart describing the processing for determining a failure location in the server of the embodiment.

FIG. 4 is a flow chart describing the processing for determining the failure location in the server 1 of the embodiment. In order to simplify the description, it is assumed that no failure exists in the communication path connecting the server and the storage 2. Therefore, it is assumed that the PC cable 20 or network cable 19 does not fall off and that frames of the FC protocol or packets of the network protocol will not be lost intermittently.

First, as noted above, the server 1 obtains the newest frame left in the copy 52 of the server 1 and the clock time when the newest frame is stored into the copy unit 52 (a first occurrence time) (S1). Then, as noted above, the server 1 obtains the newest frame left in the copy 62 of the storage 2 and the clock time when the newest frame is stored into the copy unit 62 (a second occurrence time)(S2).

The server 1 decides whether the newest frame left in the storage 2 is a received frame received from the server 1 or a transmitted frame transmitted to the server 1 (S3). For reference's sake, if the server 1 detects a timeout error, response information has not been obtained regarding to an input-output instruction transmitted by the server 1; therefore, the newest frame left in the server 1 will be the transmitted frame.

In the processing of step S3, the server 1 extracts the header (see FIG. 2) of the newest frame left in the storage. If the address of the D_ID field (see FIG. 2) included in the header is the address of the server 1, the server 1 decides that the frame is the transmitted frame. If the address of the D_ID field included in the header is the address of the storage 2, the server 1 decides that the frame is the received frame.

In this way, if the newest frame left in the storage 2 is decided as the received frame (S3 Yes), the server 1 identifies a before/after relationship between the first occurrence time and the second occurrence time (S5). If the first occurrence time is equal to or earlier than the second occurrence time (S5 Yes), the timeout error has been generated in the server 1 because, although the storage 2 has been received the frame from the server 1, the storage 2 could not respond to the frame. Therefore, the server 1 decides that a failure exists in the storage (S8) and terminates the processing for determining the failure.

If the first occurrence time is later than the second occurrence time (S5 No), the timeout error has been generated in the server 1 because the frame from the server 1 has not reached to the storage 2. Therefore, the server 1 decides that a failure exists in the GBIC 53 of the server 1 (S6) and terminates the processing for determining the failure. If the newest frame left in the storage 2 is decided as the transmitted frame (S3 No), the server 1 identifies a before/after relationship between the first occurrence time and the second occurrence time (S4).

If the first occurrence time is equal to or earlier than the second occurrence time (S4 Yes), the timeout error has been generated in the server 1 because, although the storage 2 has been transmitted response information to the server 1, the response information does not reach to the sever 1. Therefore, the server 1 decides that a failure exists in the GBIC 63 of the storage 2 (S7) and terminates the processing for determining the failure.

If the first occurrence time is later than the second occurrence time (S4 No), the timeout error has been generated in the server 1 because the frame from the server 1 has not reached to the storage 2. Therefore, the server 1 decides that a failure exists in the GBIC 53 of the server 1 (S6) and terminates the processing for determining the failure. The operations of FIG. 4 described above can be summarized as shown in a table of FIG. 5.

Figure 5:
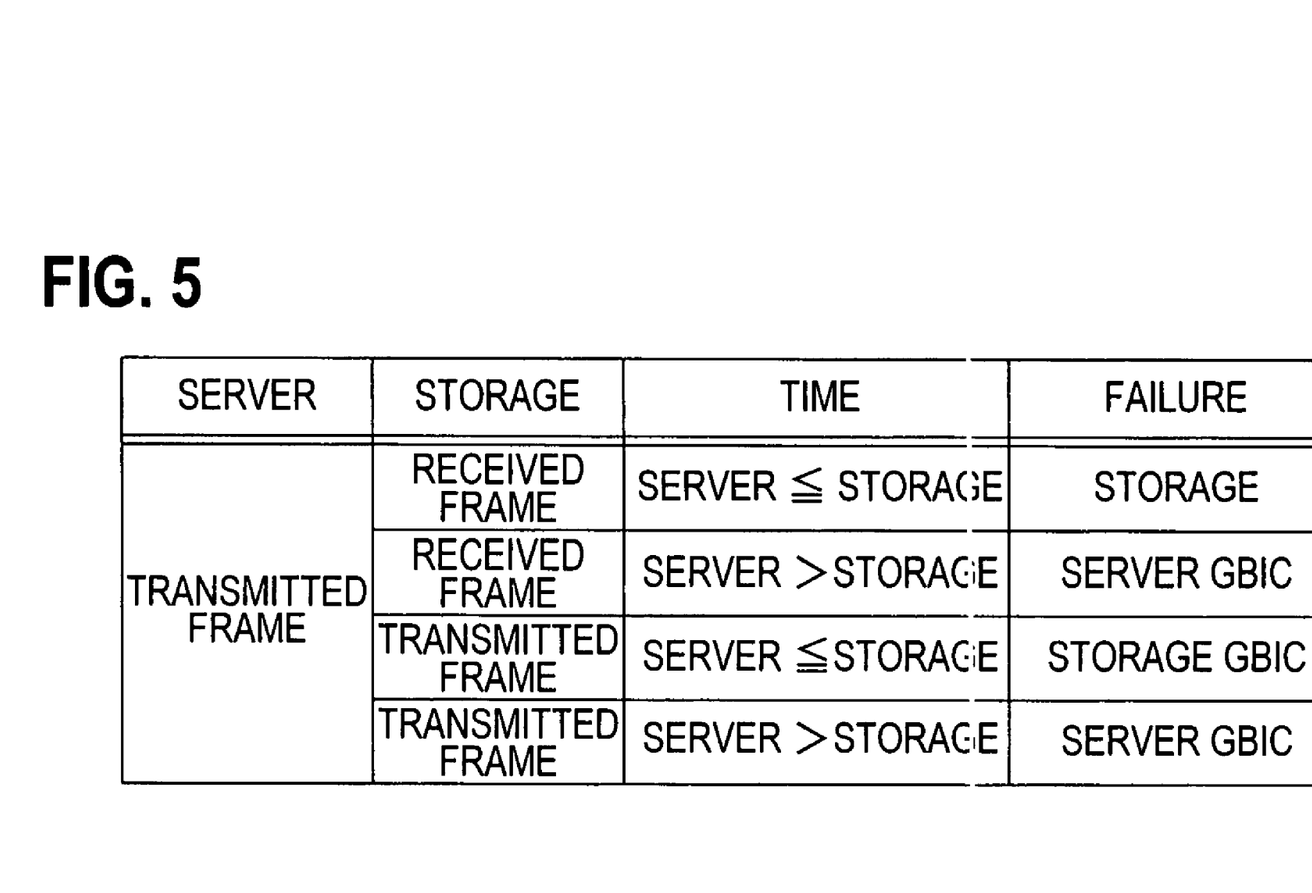
FIG. 5 is a table summarizing operations of the server of the embodiment.

In FIG. 5, "Server" indicates the newest frame left in the copy unit 52 of the server 1. "Storage" indicates the newest frame left in the copy unit 62 of the storage 2.

Servers shown in "Time" fields indicate the first occurrence time of FIG. 4, and storages shown in "Time" fields indicate the second occurrence time of FIG. 4. "Failure" indicates locations decided by the server 1 as the failure location. The details of the table of FIG. 5 are the same as the details shown in FIG. 4; therefore, descriptions are omitted.

As a premise for the description of FIG. 4, it was assumed that no failure exists in the communication path connecting the server and the storage 2. Considering a failure in the communication path connecting the server and the storage 2, the method for determining a failure of FIG. 4 will be as follows.

If it is decided as the GBIC failure of the server 1 in step S6 (if the frame from the server 1 has not reached to the storage 2), when a failure in the communication path is considered, it will be decided that the failure location does not exist at least in the storage 2. If it is decided as the GBIC failure of the storage 2 in step S7 (if the frame transmitted by the storage 2 has not reached to the server 1), when a failure in the communication path is considered, it will be decided that the failure location does not exist at least in the server 1.

In this embodiment, although the descriptions are made in the form of connecting the server 1 and the storage 2 one-on-one, if a plurality of storages are connected to the server 1, the newest frame may be stored in the copy unit 52 of the server 1 for each of storages 2. If the timeout error occurs, the server 1 can determine the failure of the timeout error as is the case with the one-on-one form by performing the processing of FIG. 4 after the server 1 identifies the destination storage of the input-output instruction.

Also, if a fiber channel switch (FC switch) is used for connecting the server 1 and the a plurality of storages 2, a copy unit may be provided in order to store the last flame passes through each port of the fiber channel switch.

Figure 6:
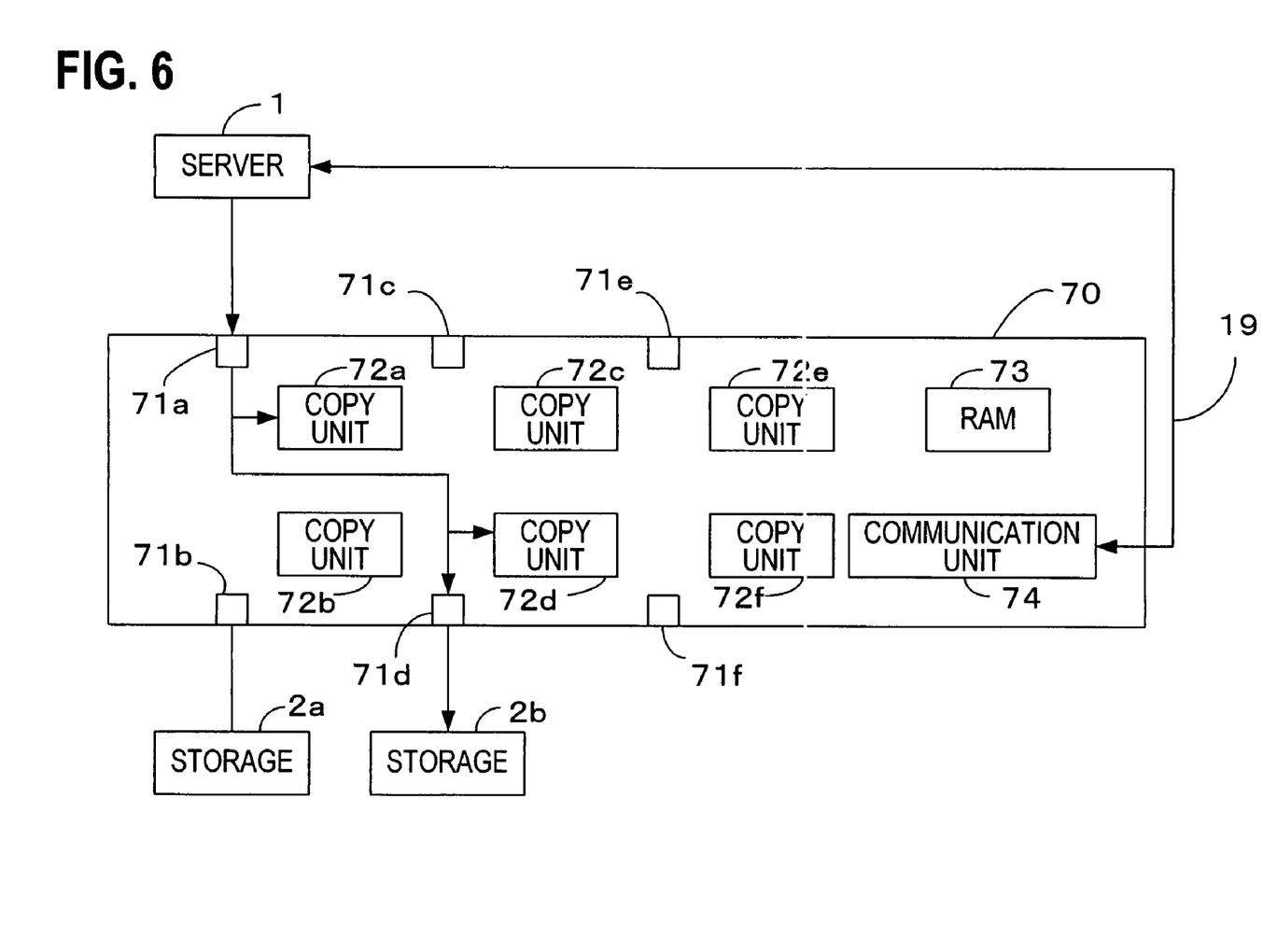
FIG. 6 is a diagram in the case of using a FC switch for connecting the server and the storages.

FIG. 6 is a diagram in the case of using the FC switch for connecting the server 1 and the storages 2. The FC switch includes eight (8) ports 71a to 71h and copy units 72a to 72h corresponding to each port. Each copy unit of FIG. 6 stores the last frame passing through the corresponding port.

Also, the FC switch 70 has a RAM 73 for storing clock times when the newest frame is stored in the copy unit of each port and a communication unit 74 for transmitting to the server 1 the newest frame stored in the copy unit of each port and the clock times stored in the RAM 25. The communication unit 74 is connected with the communication unit of the server 1 via the network cable 19.

For example, the server 1 issues an input-output instruction to the storage 2b, the port 71a connected to server 1 and the port 71d connected to the storage 2b are used. Then, the corresponding copy unit 72a and copy unit 72d stores the last frame included in the input-output instruction issued by the server 1.

When the server 1 detects a timeout error, the server 1 obtains the newest frames and clock times when the newest frames has been stored in the copy units from the copy unit 52 of the own HBA 13, the copy unit 72a and copy unit 72d, and the copy unit 62 of the CM 26 in the storage 2b, respectively. Then, the causal location can be narrowed down by performing the processing of FIG. 4 targeting the server 1 and the port 71a and the processing of FIG. 4 targeting the port 71d and the storage 2b to determine the failure.

According to the embodiment described above, when timeout error occurs, a failure location can be easily narrowed down based on the last transmitted and received frames left in the server and the storage and time information thereof, and the time required to identify the failure location can be reduced over a conventional method.

The copy unit of the FC interface storing the last transmitted or received frame is buffer memory and, when considering the number of bytes of the frame shown in FIG. 2, the capacity thereof is at most 2112 bytes. Therefore, the capacity required for the copy unit can be slightly over 2 k bytes at the very most. If the copy units are allocated to a plurality of storages, the required capacity is not so large.

The embodiment can be applied to the processing for determining a failure of the timeout error not only for the input-output instruction between the server and the storage, but also for control information between a client and the server. For example, a timeout error for a telnet command in communication control and the like can be included.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A method of determining a failure in an information system, the system including a transmission apparatus to transmit control information and a reception apparatus connected to the transmission apparatus in such a manner as to enable information to be transmitted and received, the reception apparatus to receive the control information and to transmit response information to the received control information, comprising:

obtaining, as a first clock time, a clock time of the most recently transmitted control information if the response information to the control information cannot be obtained within a predetermined time period;

obtaining, as a second clock time, a later one of a clock time of the response information most recently transmitted by the reception apparatus and a clock time of the control information most recently received by the reception apparatus; and determining a failure location based on A) a type of control information indicating whether control information is transmitted control information or received control information and B) a before/after relationship of the first clock time and the second clock time.

2. The method of determining a failure of claim 1, wherein the determining the failure location comprises:

determining that the failure location does not exist at least in the transmission apparatus if the first clock time is equal to or earlier than the second clock time, whereas the transmission apparatus decides that the failure location does not exist at least in the reception apparatus if the first clock time is later than the second clock time.

3. The method of determining a failure of claim 1, wherein the transmission apparatus is a server;

the reception apparatus is a storage;

and the control information is an input-output instruction to data stored in the storage.

4. The method of determining a failure of claim 3, wherein
the transmission apparatus and the reception apparatus are
connected to each other via a fiber channel;
the control information and the response information are
split for transmission and reception into a plurality of
frames in accordance with a fiber channel protocol;
the first clock time is a clock time when the server most
recently transmits the frame; and
the second clock time is later one of a clock time when the
storage most recently transmits the frame and a clock
time when the storage most recently receives the frame.

5. A transmission apparatus in an information system including the transmission apparatus for transmitting control information and a reception apparatus connected to the transmission apparatus in such a manner as to enable information to be transmitted and received for receiving the control information, the reception apparatus transmitting response information to the received control information, the transmission apparatus comprising:
 a first acquisition unit to obtain, as a first clock time, a clock time of the most recently transmitted control information if the response information to the control information cannot be obtained within a predetermined time period;
 a second acquisition unit to obtain, as a second clock time, a later one of a clock time of the response information most recently transmitted by the reception apparatus and a clock time of the control information most recently received by the reception apparatus; and
 a determination unit to determine a failure location based on A) a type of control information indicating whether control information is transmitted control information or received control information and B) a before/after relationship of the first clock time and the second clock time.

6. The transmission apparatus of claim 5, wherein the determination unit to decide that the failure location does not exist at least in the transmission apparatus if the first clock time is equal to or earlier than the second clock time, whereas the determination unit is further to decide that the failure location does not exist at least in the reception apparatus if the first clock time is later than the second clock time.

7. The transmission apparatus of claim 5, wherein
the transmission apparatus is a server;
the reception apparatus is a storage; and
the control information is an input-output instruction to data stored in the storage.

8. The transmission apparatus of claim 7, wherein
the transmission apparatus and the reception apparatus are connected to each other via a fiber channel, wherein the control information and the response information are split for transmission and reception into a plurality of frames in accordance with a fiber channel protocol;
the first clock time is a clock time when the server most recently transmits the frame; and
the second clock time is later one of a clock time when the storage most recently transmits the frame and a clock time when the storage most recently receives the frame.

9. A computer readable medium on which is encoded a program to drive a transmission apparatus in an information system, the system including the transmission apparatus to transmit control information and a reception apparatus connected to the transmission apparatus in a manner allowing information transmission and reception, the reception apparatus to receive the control information and to transmit response information to the received control information, the encoded program including code executed by a computerized system for:
 obtaining, as a first clock time, a clock time of the most recently transmitted control information if the response information to the control information cannot be obtained within a predetermined time period;
 obtaining, as a second clock time, a later one of a clock time of the response information most recently transmitted by the reception apparatus and a clock time of the control information most recently received by the reception apparatus; and
 determining a failure location based on A) a type of control information indicating whether control information is transmitted control information or received control information and B) a before/after relationship of the first clock time and the second clock time.

10. The computer readable medium of claim 9, wherein the code for determining the failure location includes code that decides that the failure location does not exist at least in the transmission apparatus if the first clock time is equal to or earlier than the second clock time, whereas it is decided that the failure location does not exist at least in the reception apparatus if the first clock time is later than the second clock time.

11. The computer readable medium of claim 9, wherein
the transmission apparatus is a server;
the reception apparatus is a storage; and
the control information is an input-output instruction to data stored in the storage.

12. The computer readable medium of claim 11, wherein
the transmission apparatus and the reception apparatus are connected to each other via a fiber channel;
the control information and the response information are split for transmission and reception into a plurality of frames in accordance with a fiber channel protocol;
the first clock time is a clock time when the server most recently transmits the frame; and
the second clock time is later one of a clock time when the storage most recently transmits the frame and a clock time when the storage most recently receives the frame.

* * * * *